Sept. 22, 1953 R. C. MOSES 2,653,230
RATIO DETECTOR
Filed July 19, 1948
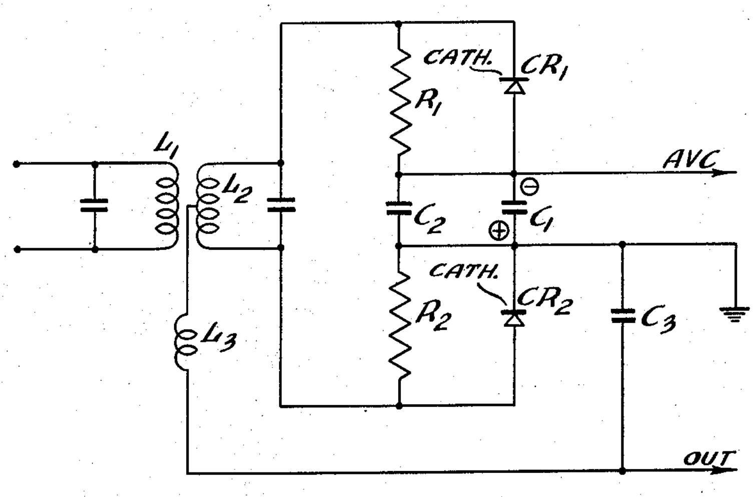
INVENTOR.
Robert C. Moses
BY [signature]
Attorney

UNITED STATES PATENT OFFICE 2,653,230

RATIO DETECTOR

Robert C. Moses, Swampscott, Mass., assignor to Sylvania Electric Products Inc., a corporation of Massachusetts Application July 19, 1948, Serial No. 39,571

3 Claims. (Cl. 250—27)

The present invention relates to ratio detectors, such as are used in the detection of frequency modulated and comparable radio signals. An object of this invention is to adapt known forms of the ratio detector for use with barrier-type rectifiers, more commonly referred to as crystal rectifiers.

Barrier rectifiers function as rectifiers by virtue of their markedly different electrical conductivity in opposite directions. When very few volts are applied to a type 1N34 germanium crystal rectifier, for example, its forward resistance amounts to 100 ohms or less, whereas voltage of the opposite polarity meets a back-resistance of the order of several hundred thousand ohms.

The back-resistance characteristics of crystal rectifiers of any one type, the germanium crystal type for example, are variable to the extent that, without careful matching of a pair of crystal rectifiers, they cannot be used in substitution for the paired vacuum-tube diodes in ratio detectors without sacrifice of advantages for which the ratio detector is noted.

Ratio detectors presently include a vacuum-tube diode having its anode connected to one terminal of an optionally center-tapped resistor, another vacuum-tube diode having its cathode connected to the opposite terminal of the resistor, and a tuned circuit including center-tapped inductance between the remaining diode terminals. The resistor is shunted by a large condenser of such size as to have a time constant long in relation to any desired demodulated frequency. An additional coil is connected to the center-tap of the inductance in the tuned circuit, and a high-frequency condenser or condenser network completes a circuit which combines the voltages in the respective halves of the center-tapped inductance with the voltage in the additional coil. The voltage in the coil is in quadrature with the voltage in the tuned circuit at center frequency. The theory of the operation of the ratio detector, various forms of ratio detector, and their important attributes are described in detail in an article entitled, "The Ratio Detector" by Stuart W. Seeley and Jack Avins in the RCA Review of June 1947, vol. VIII No. 2, pages 201–236 inclusive.

Substitution of crystal rectifiers for the vacuum-tube diodes in known ratio-detector circuits has heretofore been proposed. There are many reasons why a crystal rectifier can be used to advantage in ratio detectors. Their compactness makes it possible to enclose them in the same shield-can with the inductances in the circuit.

They can be wired directly without the socket required by vacuum-tube diodes. They require no heater and emit no heat as is characteristic of thermionic vacuum-tube diodes, and are free of contact-potential effects. Furthermore, their forward resistance is lower than that of vacuum-tube rectifiers. These features make crystal rectifiers a logical choice for ratio-detector design. On the other hand, the back-resistance of the crystal rectifier is lower than the theoretically infinite back-resistance of vacuum-tube diodes, and it is variable with time, signal level, and temperature; and the back-resistance characteristic of one crystal rectifier is likely to differ from others of the same type. These are factors barring use of crystal rectifiers in usual ratio detector circuits. Accordingly a further object of this invention is to devise a novel ratio detector circuit utilizing crystal rectifiers free of the consequences of variable back-resistance characteristics.

In accordance with the present invention the usual load resistance in the ratio detector is not connected in series with the two rectifiers, but instead is applied equally to the two rectifiers as shunt resistors. There are various forms of ratio detector employing a pair of rectifiers, including the so-called balanced ratio detector and the unbalanced ratio detector, and there are various detailed modifications of each. The present invention has broad application to ratio detectors generally, but is particularly well suited to the form of so-called unbalanced ratio detector illustrated in the drawings which is the wiring diagram of a presently preferred embodiment of the invention.

In the wiring diagram, L1 and L2 are primary and secondary windings of a tuned intermediate frequency transformer, which are desirably of high Q and of somewhat less than critical coupling. A third coil L3 is tightly coupled to the primary coil L1, the arrangement being such that the voltage in L3 is essentially in quadrature to the voltage at the terminals of secondary coil L2 at resonance. At frequencies above and below resonance, the voltage across one half of winding L2 will be more than 90° away from the voltage across L3 and at other frequencies that coil will have a voltage less than 90° displaced in relation to the voltage of coil L3; whereas, the voltage across the other half of winding L2 bears the inverse relation to the voltage of coil L3. A series circuit is connected to the terminals of secondary winding L2, that circuit including a crystal rectifier CR1, a large stabilizing condenser C1 and a second crystal rectifier CR2, the positive terminal of rectifier CR1 being connected to one terminal of condenser C1 and the negative terminal of crystal rectifier CR2 being connected to the other terminal of condenser C1 which terminal is also grounded. A resistor R1 is connected directly to the terminals of rectifier CR1 and a second resistor R2 is connected directly to the terminals of rectifiers CR2. Each resistor has a value considerably higher than the forward resistance of the crystal rectifier to which it is connected, but considerably lower than the back resistance of that rectifier. The resistance of resistor R1 should however be closely equal to the resistance of resistor R2. The size of condenser C1 is chosen in relation to the values of resistors R1 and R2 added together so as to provide a long time constant in relation to any detected audio frequency. Using germanium crystal rectifiers type 1N34, resistors of 18,000 ohms have been found appropriate but in no wise critical, together with a condenser C1 of about 8 microfarads.

In order that condenser C1 may be of the electrolytic type and therefore compact, R. F. bypass condenser C2 is connected in parallel with condenser C1. Condenser C3 is joined to the free terminal of coil L3, and the other terminal of condenser C3 is grounded. Because both terminals of condenser C2 are effectively at a common potential at the input frequency, condenser C3 may be said to complete the circuit of coil L3 from the center tap of coil L2 to a balanced point in the output circuit. Tracing the high-frequency circuit (in contrast to the audio frequency or demodulation circuit) it will be seen that the voltage induced in coil L3 is added vectorially to the voltages in the halves of coil L2, and these vectorially combined voltages are applied to the rectifiers with their shunt resistors and to the several condensers shown. The halves of coil L2 in series are effective through the rectifiers similarly in series to charge condenser C1 during their intervals of forward conduction to some value near the peak of the intermediate-frequency voltage; and this remains very nearly constant despite usual deviation of the frequency modulated signal. In the event that the signal should diminish or rise, condenser C1 tends to follow that diminution or increase, so that the voltage difference across the condenser terminals may be used for automatic-volume-control bias of amplifiers preceding windings L1 and L2 in the circuit. At frequencies above and below resonance the junction of coil L3 and condenser C3 varies in potential in accordance with the frequency deviation.

During the instants when crystal rectifiers CR1 and CR2 are conductive, they are effective to charge condenser C1. During the intervals of high back resistance the condenser C1 tends to discharge through resistors R1 and R2, thus biasing rectifiers CR1 and CR2 well up into the high resistance portions of their characteristics. The net resistance of CR1 and CR2 with shunt resistors R1 and R2 respectively will remain substantially constant even though the back resistances of the rectifiers be widely different. Resistors R1 and R2 thus have the dual effects of swamping the back resistances of the crystals and of serving as load resistors.

The use of crystal rectifiers in place of vacuum tube diodes has known advantages previously described. In addition, crystal rectifiers are especially useful in ratio detectors because of the absence of contact potential which is characteristic of vacuum-tube diodes. Variation of contact potential from one diode to the next may upset the self-limiting action of the ratio detector. With unequal contact potentials there is also a tendency of the output terminal to have a static bias in relation to ground; and where the difference in contact potential of the two diodes varies, varying performance of the driven amplifier, and of the ratio detector itself, can be expected. For best performance of the ratio detector, the halves of the ratio detector should be symmetrical and should remain so in operation.

Certain variations of the disclosed circuit will occur to those skilled in the art. Thus, condenser C3 may be replaced by a pair of equal condensers connected in series across condenser C1, the output and the high-frequency connection of coil 3 being taken at the junction of the two condensers in such circuit. Likewise the quadrature voltages obtained by means of coil L2 and L3 can be obtained with circuit elements and arrangements other than that shown. Therefore I desire that the appended claims be given broad interpretation, consistent with the spirit of the invention.

What is claimed is:

1. In a frequency modulation receiver, a detector comprising a resonant center-tapped direct-current-conductive circuit having frequency-modulated energization, another circuit having like frequency-modulated energization in quadrature to that of the center-tapped circuit at resonance, a series circuit comprising a first crystal rectifier, a direct-current stabilizer, and a second crystal rectifier in the order named and connected to the terminals of the center-tapped circuit, substantially equal resistors connected directly across said crystal rectifiers, respectively, the resistance of each resistor being large in relation to the forward conductive resistance of the crystal rectifiers and low in relation to the back-resistance of the crystal rectifiers, and a high frequency return circuit connected to one terminal of the quadrature energized circuit and a point between said rectifiers.

2. In a frequency-modulation receiver, a detector comprising a resonant center-tapped direct-current-conductive circuit having frequency-modulated energization, another circuit having like frequency-modulated energization in quadrature to that of the center-tapped circuit at resonance, a series circuit connected across said center-tapped circuit comprising a first crystal rectifier, a large condenser, and a second crystal rectifier, the anode terminal of one rectifier being connected to the condenser and the cathode terminal of the other rectifier being connected to the condenser, substantially equal resistors connected directly across said crystal rectifiers, respectively, the resistance of each resistor being large in relation to the forward conductive resistance of the crystal rectifiers and low in relation to the back-resistance of the crystal rectifiers, the time-constant of the condenser and the sum of the resistances of said resistors being long in relation to the period of any lowest-frequency component of the demodulated signal, and a high-frequency return circuit connected to one terminal of the quadrature energized circuit and a point between said rectifiers.

3. A ratio detector comprising a center-tapped coil shunted by a tuning condenser, an additional coil having one terminal connected to the center tap of said tuned inductance, input circuit means for inducing voltages in said coils, the mutual arrangement of said input circuit means and said coils being such as to produce a 90° phase shift between said coils at resonance, a series circuit connected to the terminals of said tuning condenser comprising a crystal rectifier having its anode connected to one terminal of the condenser, a second crystal rectifier having its cathode connected to the opposite terminal of the condenser, and a large condenser between the remaining terminals of said crystal rectifiers, substantially equal resistors shunting said crystal rectifiers, the sum of the resistances of said resistors with the large condenser having a time constant which is long in relation to the lowest desired demodulated frequency, and a small condenser completing the carrier frequency return circuit of said additional coil connected between the free end of said additional coil and one terminal of said large condenser.

ROBERT C. MOSES.

References Cited in the file of this patent

UNITED STATES PATENTS

| Number | Name | Date |
|---|---|---|
| 2,404,359 | Bond | July 23, 1946 |
| 2,410,983 | Koch | Nov. 12, 1946 |
| 2,412,482 | Vikomerson | Dec. 10, 1946 |
| 2,497,840 | Seeley | Feb. 14, 1950 |
| 2,552,052 | Matare | May 8, 1951 |
| 2,561,089 | Anderson | July 17, 1951 |

FOREIGN PATENTS

| Number | Country | Date |
|---|---|---|
| 452,925 | Great Britain | Sept. 1, 1936 |